United States Patent
Bangar

(10) Patent No.: US 11,802,597 B1
(45) Date of Patent: Oct. 31, 2023

(54) DISCONNECT ASSEMBLY WITH A DOG CLUTCH AND METHOD FOR OPERATION OF THE DISCONNECT ASSEMBLY

(71) Applicant: Dana Automotive Systems Group, LLC, Maumee, OH (US)

(72) Inventor: Sagar B. Bangar, Ypsilanti, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 17/806,917

(22) Filed: Jun. 14, 2022

(51) Int. Cl.
*F16D 48/06* (2006.01)
*F16D 27/118* (2006.01)

(52) U.S. Cl.
CPC .......... *F16D 48/064* (2013.01); *F16D 27/118* (2013.01); *F16D 2500/1022* (2013.01); *F16D 2500/1064* (2013.01); *F16D 2500/10425* (2013.01); *F16D 2500/10462* (2013.01); *F16D 2500/3022* (2013.01); *F16D 2500/30401* (2013.01)

(58) Field of Classification Search
CPC ................ F16D 27/118; F16D 48/064; F16D 2500/3022; F16D 2500/1064; F16D 2500/10425; F16D 2500/1022
See application file for complete search history.

(56) References Cited

U.S. PATENT DOCUMENTS

| | | | |
|---|---|---|---|
| 4,947,971 A * | 8/1990 | Tanaka | B60W 10/107 477/97 |
| 7,325,664 B2 | 2/2008 | Fusegi | |
| 10,260,572 B2 * | 4/2019 | Haupt | F16H 48/08 |
| 2002/0040612 A1 * | 4/2002 | Miyamoto | F16D 48/064 477/80 |
| 2010/0276245 A1 | 11/2010 | Umeno et al. | |
| 2018/0087588 A1 * | 3/2018 | Hashimoto | F16D 48/064 |
| 2020/0079214 A1 * | 3/2020 | Johnson | F16H 48/08 |

FOREIGN PATENT DOCUMENTS

| | | | |
|---|---|---|---|
| CN | 214189303 U | * | 9/2021 |
| JP | S55119232 A | | 9/1980 |
| JP | 2008286408 A | | 11/2008 |

* cited by examiner

*Primary Examiner* — Stacey A Fluhart
(74) *Attorney, Agent, or Firm* — McCoy Russell LLP

(57) ABSTRACT

Methods and systems are provided for a differential disconnect assembly of a vehicle, the differential disconnect assembly including a dog clutch used to engage and disengage a gear of a differential of the vehicle from a transmission of the vehicle. In one example, a method for operating a dog clutch comprises de-energizing a solenoid coupled to the dog clutch to initiate dog clutch disengagement; and during disengagement of the dog clutch when a return spring coupled to a first toothed interface of the dog clutch applies a first force on the first toothed interface in a first direction away from a second toothed interface, transiently re-energizing the solenoid that applies a second force to the first toothed interface in a second direction which is opposite the first direction.

19 Claims, 5 Drawing Sheets

DISCONNECT ASSEMBLY WITH A DOG CLUTCH AND METHOD FOR OPERATION OF THE DISCONNECT ASSEMBLY

TECHNICAL FIELD

The present description relates generally to methods and systems for a disconnect assembly with a dog clutch in a vehicle driveline and a method for adjusting the disconnect assembly.

BACKGROUND AND SUMMARY

In automotive applications, disconnect assemblies have been employed in certain vehicle platforms to reduce losses in the powertrain. These disconnect assemblies may be used in combustion engine powertrains as well as electric vehicle powertrains. Certain electric drive units with permanent magnet motors may specifically make use of disconnect assemblies to decrease losses in the powertrain when motive power generation is not desired.

Some prior split-differential disconnect assemblies have included a dog clutches that are engaged and/or disengaged using solenoids. In these disconnect assemblies, solenoid energization is used to both engage and disengage the dog clutch. A first current may be delivered at the solenoid to move the dog clutch into an engaged position, and a second current may be delivered at the solenoid to move the dog clutch into a disengaged position. Due to requirements of disconnecting a dog clutch at higher torque levels, an amount of force used to disengage the dog clutch may be high. As a result of the high amount of force applied to the dog clutch at disengagement, the dog clutch may impact other components of the disconnect assembly, generating an undesirable amount of noise, vibration, and harshness (NVH). US 2010/0276245 A1 to Umeno et al. discloses controlling an electromagnetic attractive force generated by the solenoid to reduce the undesirable amount of noise. U.S. Pat. No. 7,325,664 B2 to Fusegi similarly controls the second current to hold the dog clutch in place after disengagement, where the second current is initiated at a predetermined time after disengagement.

The inventors have recognized several drawbacks with Umeno's clutch controls strategy as well as other previous clutch control techniques. Umeno's clutch control strategy consumes a high amount of energy, thereby decreasing the power.

The issues described above may be at least partially addressed by a method for operating a dog clutch, comprising de-energizing a solenoid coupled to the dog clutch to initiate dog clutch disengagement. The method further includes, during disengagement of the dog clutch when a return spring coupled to a first toothed interface of the dog clutch applies a first force on the first toothed interface in a first direction away from a second toothed interface, transiently re-energizing the solenoid that applies a second force to the first toothed interface in a second direction which is opposite the first direction. By re-energizing the solenoid as the dog clutch is retracted by the return spring, the first force may be opposed by the second force, slowing a travel of the dog clutch prior to reaching a fully retracted position at which the dog clutch may impact with other components of the differential disconnect assembly. In this way, the amount of undesirable NVH may be reduced, thereby increasing customer appeal and clutch longevity, in certain cases. After the dog clutch reaches the fully retracted position, the solenoid may be turned off, reducing an amount of power consumed by the solenoid.

Re-energizing the solenoid may occur at a predetermined time that is determined based on simulation models which are fine-tuned to achieve noise reduction targets. Alternatively, re-energizing the solenoid may be controlled based on an output of an engagement sensor that indicates that the dog clutch is moving from an engagement zone to a transition zone. By using the sensor to control a second current delivered at the solenoid, a timing of the re-energizing may be precisely controlled to decrease both the amount of undesirable noise and an amount of the energy consumed by the solenoid.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The present disclosure will be better understood from reading the following description of non-limiting embodiments, with reference to the attached drawings, wherein below.

Figure 1:
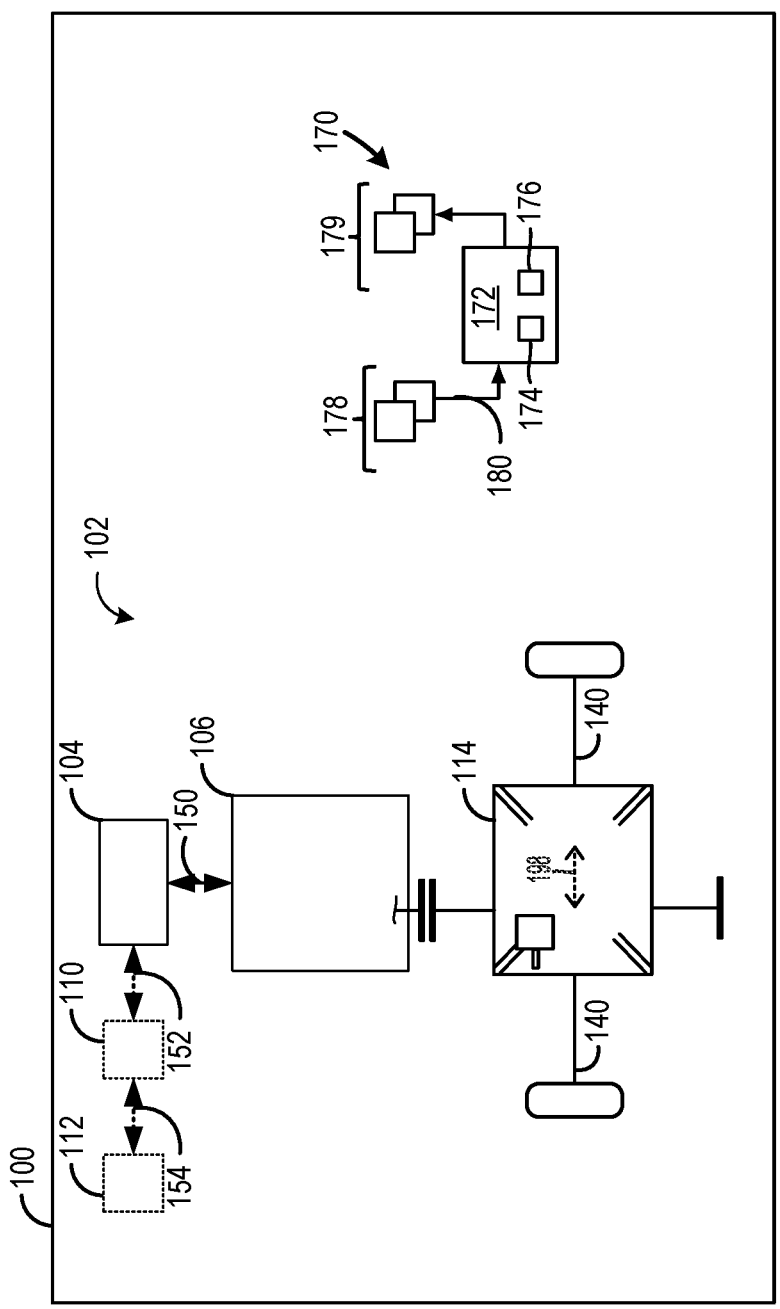
FIG. 1 schematically shows a vehicle including a differential and a differential disconnect assembly, in accordance with one or more embodiments of the present disclosure.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

The following description relates to systems methods for controlling an engagement and/or disengagement of a differential disconnect assembly of a vehicle, such as the vehicle shown in FIG. 1. The differential disconnect assembly may include a dog clutch that couples a gear of a transmission of the vehicle with one or more gears of a differential of the vehicle, as described in reference to FIGS. 2A and 2B. An engagement of the dog clutch with the one or more gears of the differential may be controlled using a solenoid and a spring by following one or more steps of an exemplary method illustrated in FIG. 3. During disengagement of the dog clutch, different events may occur with a timing shown in the timing diagram of FIG. 4.

FIG. 1 shows a vehicle 100. The vehicle 100 may be a light, medium, or heavy duty vehicle. The vehicle 100 includes a drive unit 102. As such, the vehicle 100 may be an electric vehicle (e.g., an all-electric vehicle or a hybrid electric vehicle which includes an internal combustion engine). To elaborate, the electric drive unit 102 may provide motive power to one or more drive axles 140. For instance, in one use-case example, the electric drive unit 102 may include two electric axles with separate traction motors. Alternatively, the electric drive unit 102 may include one traction motor that distributes motive power to one or both of the drive axles based on vehicle operating conditions and/or operator predilection. In either example, the electric drive unit 102 may be a four-wheel electric drive unit (e.g., all-wheel electric drive unit) where front and rear drive wheels may receive motive power during certain operating conditions. In the hybrid vehicle embodiment, the vehicle 100 may include an axle receiving motive power from an electric motor and another axle that receives motive power from an internal combustion engine, during drive operation. Further, in other examples, the electric drive unit may be incorporated into a front wheel drive powertrain or a rear wheel drive powertrain.

The drive unit 102 includes a prime mover 104 (e.g., an electric motor, an internal combustion engine, and the like) mechanically coupled to a transmission 106. In the EV example, the electric motor may be a permanent magnet (PM) type motor that may be more generally an alternating current (AC) motor. In such an example, the electric motor 104 receives electric power from an inverter 110 that in turn receives electric energy from one or more energy storage device(s) 112 (e.g., traction batteries, capacitors, combinations thereof, and the like). Arrows 150 denote the mechanical power transfer between the prime mover 104 and the transmission 106. Arrows 152 denote the electric power transfer between the electric motor 104, and arrows 154 denote the electric power transfer between the inverter 110 and the energy storage device(s) 112. Mechanical power may be transferred from the transmission 106 to the one or more drive axles 140 via a differential 114.

The vehicle 100 further includes a control system 170 with controller 172 (e.g., an electronic control unit (ECU) such as a transmission control unit (TCU), a vehicle control unit (VCU), combinations thereof, and the like). The controller 172 may be designed to implement the control strategies described herein. To accomplish the aforementioned vehicle control functionality, the vehicle controller may include memory 174 which stores instructions executable by a processor 176 to carry out the vehicle control strategies described herein.

One or more input devices 178 such as a drive mode selector, accelerator pedal, brake pedal, touch interface, combinations thereof, and the like may be in electronic communication with the controller 172 as denoted by arrows 180. The drive mode selector may be a button, switch, touch interface, slider, or combinations thereof that allows the vehicle operator to trigger disconnection of the transmission 106 from the drive wheels. For instance, the drive mode selector may allow the vehicle to switch from a two-wheel drive mode to a four-wheel drive mode, when the vehicle includes a second electric axle. The controller 172 may control one or more components of vehicle 100 via one or more actuators 179. For example, an actuator of the one or more actuators 179 may control the disconnection of the transmission 106 from the drive wheels.

Figure 2A:
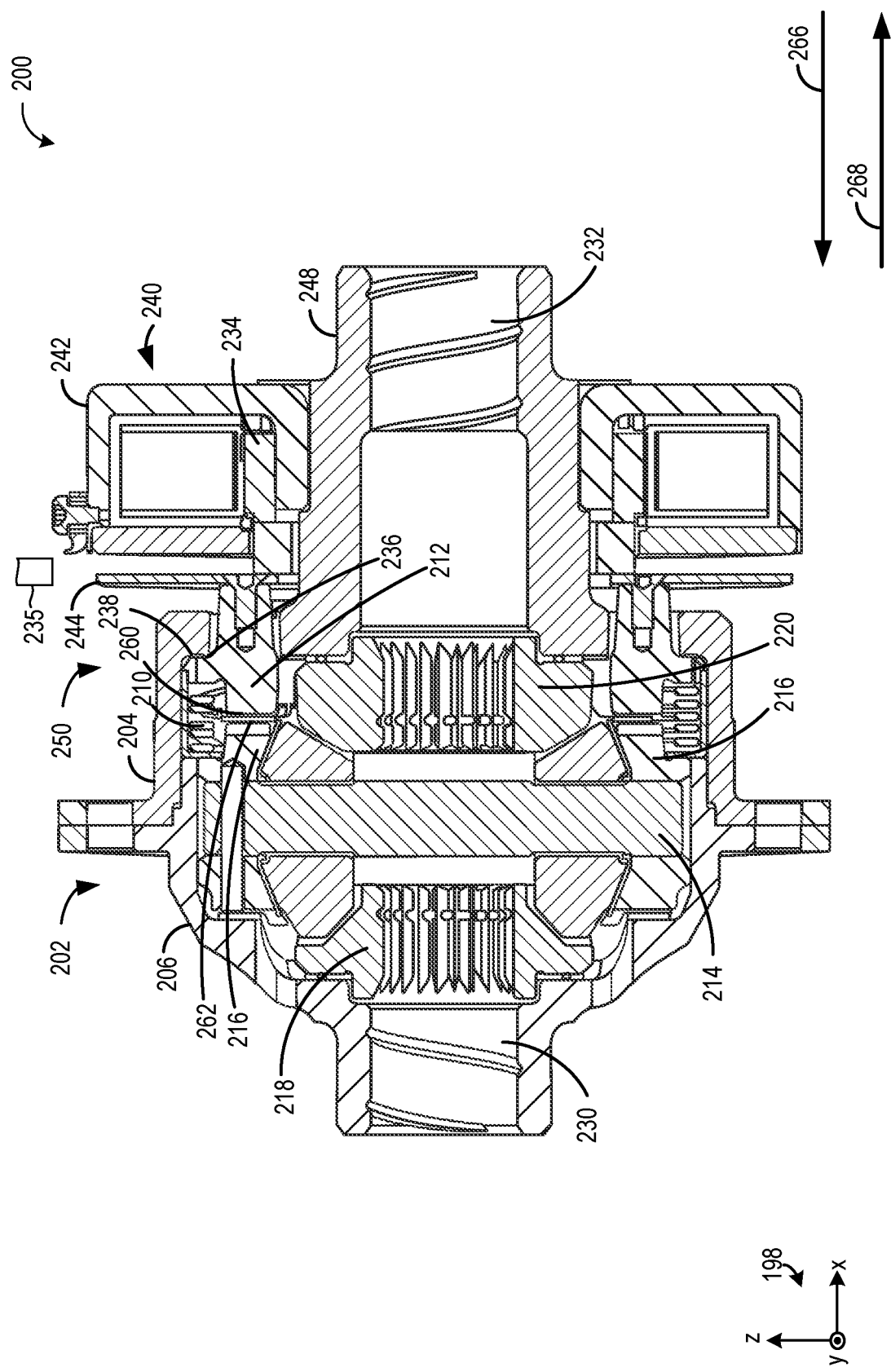
FIG. 2A shows a schematic diagram of a differential including a differential disconnect assembly, in accordance with one or more embodiments of the present disclosure.
Figure 2B:
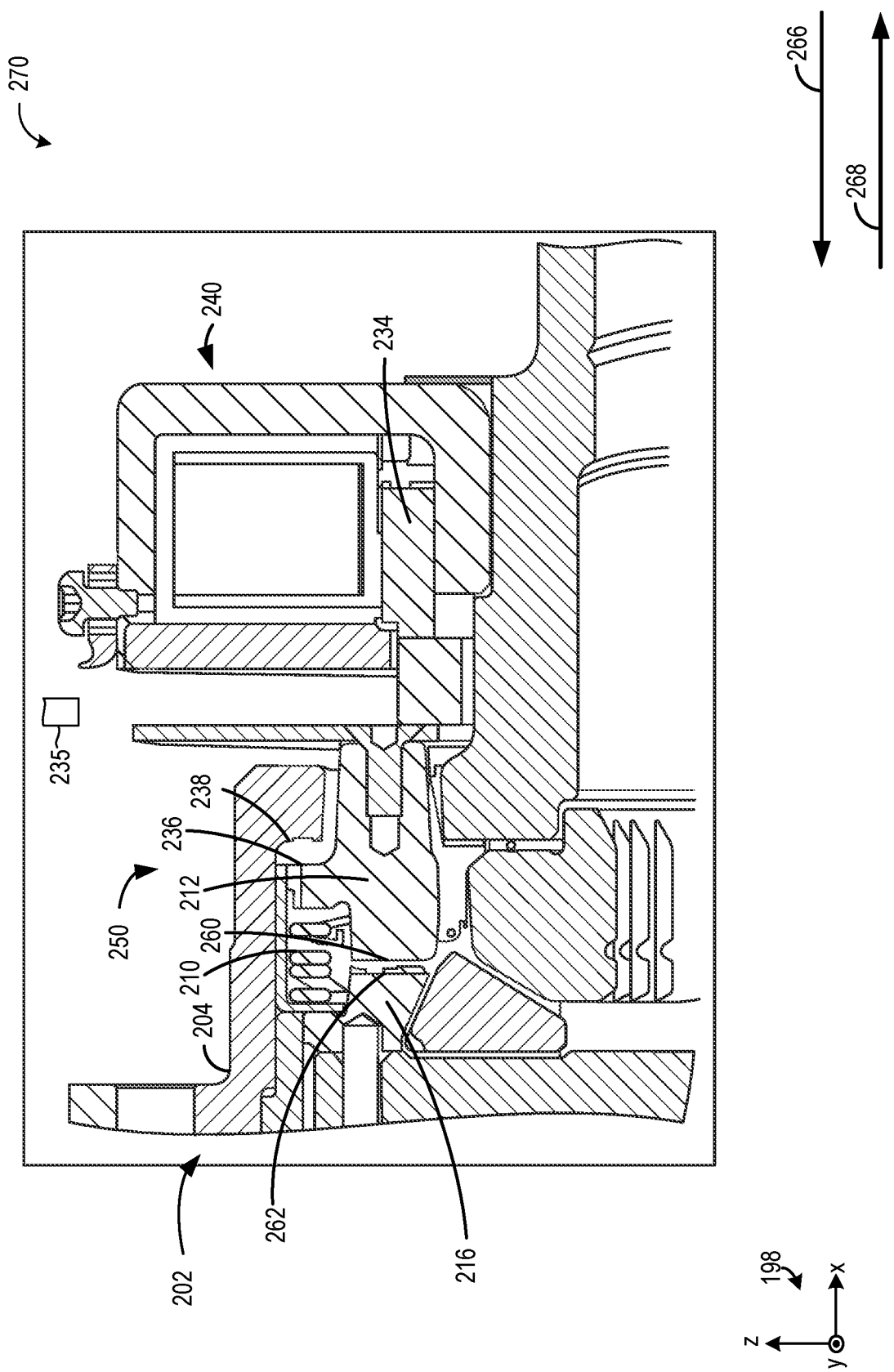
FIG. 2B shows an expanded view of the differential disconnect assembly of FIG. 2A, in accordance with one or more embodiments of the present disclosure.

An axis system 199 is provided in FIG. 1 as well as FIGS. 2A-2B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. A rotational axis 198 of the differential 114 is further provided in FIGS. 2A-2B, for reference. It will be understood that the rotational axis 198 may be coaxial to the rotational axes of the axle shafts 140.

FIG. 2A shows an example of a differential system 200 of a vehicle, such as the vehicle 100 of FIG. 1. The differential system 200 may share at least some of the structural and functional features with the differential 114 of FIG. 1. Therefore, redundant description of these overlapping features is omitted for concision.

The differential system 200 includes a case 202 in the illustrated example. The case 202 may be designed with multiple sections. For example, the case 202 may include a first section 204, and a second section 206. The case 202 may include a gear (e.g., a ring gear) that meshes with a gear of a transmission, such as transmission 106 of FIG. 1. As such, the differential may be mechanically coupled to an electric motor (e.g., the electric motor 104 of FIG. 1) by way of the transmission.

In the illustrated example, the differential system 200 may include a shaft 214 on which pinion gears 216 reside. The pinion gears 216 mesh with a left side gear 218 and a right side gear 220. When installed in the powertrain, the left side gear 218 and the right side gear 220 are coupled to a left axle shaft 230 and a right axle shaft 232, respectively, via splined engagement and/or other suitable mechanical attachment. The axle shafts 230, 232 may be in turn rotationally coupled to drive wheels of the vehicle.

The transfer of mechanical power through the differential system 200 is selectively interrupted via a differential disconnect assembly 250. The differential disconnect assembly 250 includes a dog clutch 212, which may be controlled by a solenoid 240 arranged circumferentially around an axle sleeve 248 of right axle shaft 232, within a solenoid case 242. The dog clutch 212 may be controlled by one or more electric currents received at the solenoid 240 from a power source of the vehicle (e.g., the one or more energy storage device(s) 112). The dog clutch 212 may be mounted on or otherwise actuated via a piston 234 of the solenoid 240, where the dog clutch 212 may be slidably engaged with the pinion gears 216 of the differential based on a movement of the piston. The movement of the piston may be controlled by a magnetic field generated by the one or more electric currents received at the solenoid 240.

In FIG. 2A, the differential disconnect assembly 250 is depicted in a first, disengaged position, where the transfer of mechanical power through the differential system 200 is selectively interrupted, and no mechanical power is transferred to the axle shafts 230, 232 via differential system 200. The dog clutch 212 is held in the first, disengaged position by a return spring 210, which may be attached to the section 206 of the differential case 202. When the dog clutch 212 is held in the first, disengaged position, a first toothed interface 260 of the dog clutch 212 is not engaged with a second toothed interface 262 of the pinion gears 216. In the first, disengaged position, the piston 234 of the solenoid may be fully retracted, and a side face 236 of the dog clutch 212 may be in face-sharing contact with a face 238 of first section 204 of the case 202.

The controller may engage the dog clutch 212 with the pinion gears 216 by energizing the solenoid 240 via a first current from the power source. As a result of the first current being received at the solenoid 240 from the power source, a magnetic field at the solenoid 240 may actuate the piston 234 to extend out of the solenoid 240, whereby the dog clutch 212 moved into a second, engaged position. Moving the dog clutch 212 into the second, engaged position may include sliding the dog clutch 212 toward the pinion gear 216, in an engagement direction indicated by an arrow 266. When the dog clutch 212 is in the second, engaged position, the first toothed interface 260 of the dog clutch 212 is engaged with the second toothed interface 262 of the pinion gears 216. As a result of the first toothed interface 260 being engaged with the second toothed interface 262, mechanical power is transferred from the ring gear to the axle shafts 230, 232 via the dog clutch 212 and the differential system 200.

To disengage the dog clutch 212 from the pinion gears 216, the controller may de-energize the solenoid 240 by switching off the first current from the power source. When the first current is switched off, the magnetic field drops to zero, and the piston 234 retracts into the solenoid 240 as a result of a force applied by the spring 210 away from the pinion gear 216, in a disengagement direction indicated by an arrow 268. The dog clutch 212 may slide into the first, disengaged position, where the first toothed interface 260 of the dog clutch 212 is not engaged with the second toothed interface 262 of the pinion gears 216. As a result of the dog clutch 212 being in the first, disengaged position, the transfer of mechanical power through the differential system 200 is selectively interrupted, and no mechanical power is transferred to the axle shafts 230, 232 via differential system 200.

Due to timing demands of disconnecting a dog clutch at a higher torque level, a first force used by the spring 210 to slide the dog clutch 212 from the second, engaged position to the first, disengaged position may be high. Due to the high first force, greater noise may be produced when the dog clutch 212 slides into the first, disengaged position. The noise may be produced as a result of disconnecting parts reaching the end of their travel and hitting other components with a significant force. For example, when the magnetic field is turned off, the side face 236 of the dog clutch 212 may impact with the face 238 of the first section 204 of the differential case 202. To reduce the noise generated during disengagement of the dog clutch 212, as described in greater detail below in reference to FIGS. 3 and 4, the controller may re-energize the solenoid 240 via a second current as the dog clutch 212 travels between the second, engaged position and the first, disengaged position, where the second current may be less than the first current. When the solenoid 240 is re-energized with the second current, a second force may be generated on the piston 234 in an opposite direction of the first force of the spring (e.g., in the engagement direction indicated by the arrow 266). As a result of the second force, an impact of the dog clutch 212 with the first section 204 of the differential case 202 may be reduced, thereby reducing the amount of noise generated during the disengagement of the dog clutch 212.

In some embodiments, the re-energization of the solenoid with the second current may be timed to occur at a desired time, where the desired time is a time at which a disengagement efficiency is maximized and noise is minimized. The time of turning on the solenoid and an amount of current used to re-energize the solenoid may be optimized based on simulation models that may be fine-tuned to achieve noise performance targets.

In other embodiments, the re-energization of the solenoid with the second current may be based on an output of an engagement sensor 235. The engagement sensor 235 may be positioned along a trajectory of the dog clutch between the first, engaged position and the second, disengaged position (e.g., a fully retracted position of the piston). The engagement sensor may indicate, for example, whether the dog clutch is in an engagement zone (e.g., engaged, about to be engaged, having just been disengaged), or whether the dog clutch is in a transition zone (e.g., where the dog clutch is transitioning between the engaged zone and the fully retracted position). When the output of the engagement sensor 235 indicates that the dog clutch has left the engaged zone and entered the transition zone, the controller may re-energize the solenoid with the second current. When the engagement sensor 235 indicates that the dog clutch and/or piston has achieved the fully retracted position, the controller may de-energize the solenoid. When the solenoid is de-energized, the dog clutch may be maintained in the fully retracted position by the spring.

FIG. 2B shows an expanded view 270 of the differential system 200 of FIG. 2A, where the differential disconnect assembly 250 is in the second, engaged position. In the second, engaged position, the piston 234 of the solenoid 240 is in a fully extended position in the engagement direction 266, as a result of the first current delivered to the solenoid 240. As a result of the piston 234 being fully extended, the first toothed interface 260 of the dog clutch 212 is engaged with the second toothed interface 262 of the pinion gears 216, whereby mechanical power is transferred to the axle shafts 230, 232 via differential system 200. Additionally, the side face 236 of the dog clutch 212 is not in face-sharing contact with the face 238 of first section 204 of the case 202.

Figure 3:
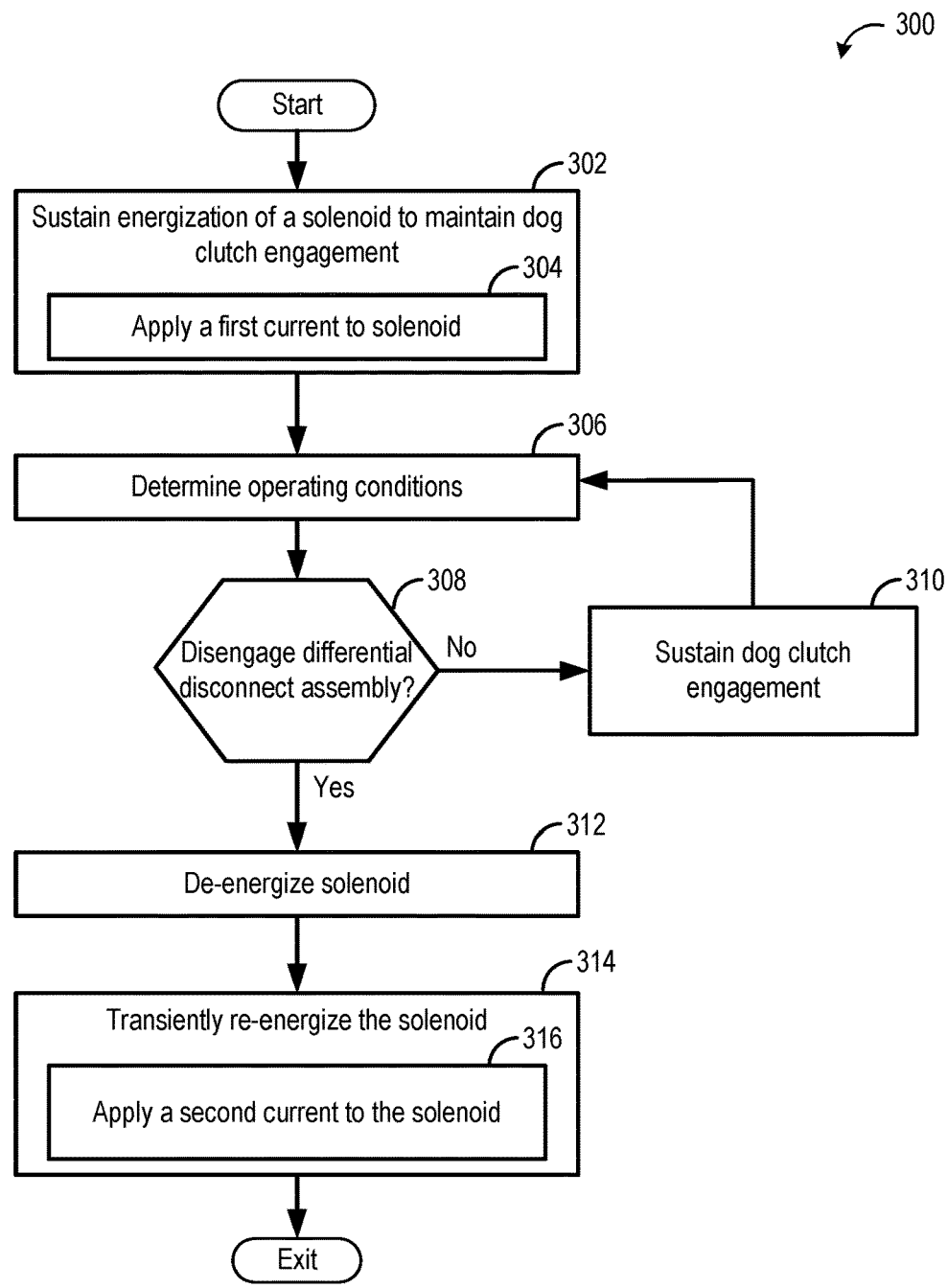
FIG. 3 is a flowchart illustrating an exemplary method for controlling engagement and disengagement of a dog clutch of a differential disconnect assembly, in accordance with one or more embodiments of the present disclosure.

FIG. 3 shows an example method 300 for operation of a differential disconnect assembly in a transmission system, such as the differential disconnect assembly 250 described above in reference to FIGS. 2A and 2B, in one example, or another suitable differential disconnect assembly, in another example. Method 300 may be carried out by a controller, and stored as instructions in memory therein. Instructions for carrying out method 300 may be executed by the controller in conjunction with signals received from sensors of the vehicle, such as the sensors described above with reference to FIG. 1. The controller may employ actuators of the system to adjust operation of the system, according to the method described below.

Method 300 begins at 302, where the method includes sustaining energization of a solenoid (e.g., the solenoid 240) to maintain the differential disconnect assembly in an engaged position, via a dog clutch (e.g., the dog clutch 212). The differential disconnect assembly may include an input gear designed to mesh with gear in a transmission and one or more pinion gears (e.g., pinion gears 216) that mesh with a plurality of output gears (e.g. side gears 218 and 220), where maintaining the differential disconnect assembly in the engaged position may include connecting the input gear to the plurality of output gears via the dog clutch. Disengaging the differential disconnect assembly may include selectively disconnecting the input gear from the plurality of output gears via the dog clutch.

At 304, sustaining energization of the solenoid includes applying a first current to the solenoid, to energize the solenoid. When the solenoid is energized with the first current, a first magnetic field is generated around a piston of the solenoid (e.g., the piston 234), where the piston is mechanically coupled to the dog clutch. The first magnetic field may generate a force on the piston in an engagement direction of the dog clutch. For example, the piston may be maintained in a fully retracted position by a return spring (e.g., return spring 210) of the differential disconnect assembly. The return spring may exert a force on the dog clutch coupled to the piston in a disengagement direction. When the solenoid is energized with the first current, the force generated by the first magnetic field may cause the piston of the solenoid to extend away from the fully retracted position (e.g., to engage the dog clutch). As the piston extends away from the fully retracted position, an amount of force applied to the piston in an opposite direction by the return spring increases. The first current may be a current at which the force generated on the piston by the first magnetic field in the engagement direction is equal to the force generated on the piston by the return spring in the disengagement direction, whereby the dog clutch is maintained at a fully engaged position.

At 306, method 300 includes determining operating conditions in the transmission system and/or vehicle. Determining operating conditions of the vehicle may include determining a current gear of the transmission, and whether the vehicle is in four-wheel-drive (4WD) or two-wheel-drive (2WD). Determining whether the vehicle is in 4WD or 2WD may include determining whether a differential of the vehicle, such as an axle differential, is in an engaged position or a disengaged position (e.g., a position of a dog clutch of the differential disconnect assembly). The vehicle operating conditions may also include a speed of the vehicle, road and/or environmental conditions detected via sensors of the vehicle. In some embodiments, a controller of the vehicle may determine whether to operate the vehicle in 4WD or 2WD based on one or more vehicle and/or environmental factors, whereby the vehicle operating conditions may include the one or more vehicle and/or environment factors.

At 308, method 300 includes determining whether to disengage the differential disconnect assembly. In some embodiments, the differential disconnect assembly may be disengaged in response to an actuation of an input device by an operator of the vehicle, where the input device is designed to toggle the differential between dog clutch engagement and disengagement. In other embodiments, the differential disconnect assembly may be disengaged automatically based on the vehicle operating conditions. As an example, the vehicle may be operating in a first terrain, such as a dirt road, where based on the vehicle operating conditions the controller may command the vehicle to operate in 4WD. The vehicle may subsequently leave the first terrain and enter a second terrain, such as a smoothly paved road, where based on the vehicle operating conditions the controller may determine that the vehicle would be more efficiently operated in 2WD. As a result of the controller determining that the vehicle would be more efficiently operated 2WD, the controller may command the disengagement of the differential disconnect assembly.

If at 308 the differential disconnect assembly is not disengaged, method 300 proceeds to 310. At 310, method 300 includes sustaining an engagement of the dog clutch, as described above. Sustaining the engagement of the dog clutch may include maintaining the first current applied to the solenoid, to maintain the first magnetic field.

If at 308 the differential disconnect assembly is disengaged, method 300 proceeds to 312. At 312, method 300 includes discontinuing the first current to de-energize the solenoid. When the first current is discontinued, the first magnetic field is no longer maintained, whereby the force exerted on the piston in the engagement direction by the first magnetic field is decreased to zero. As a result of the force exerted on the piston in the engagement direction decreasing to zero, the piston is moved in the disengagement direction (e.g., towards the fully retracted position of the dog clutch) by the force of the return spring.

At 314, method 300 includes transiently reenergizing the solenoid to reduce the force exerted on the piston in the disengagement direction by the return spring. In the absence of a force in the engagement direction (e.g., generated by the first magnetic field), a speed of the piston traveling towards the fully retracted position may be higher than desired, whereby the amount of noise generated when the dog clutch achieves the fully retracted position may be high. For example, the piston may strike other components of the differential disengagement assembly when it reaches the fully retracted position. Therefore, to reduce the amount of noise generated when the piston achieves the fully retracted position, the solenoid may be transiently reenergized as the piston approaches the fully retracted position to generate a force on the piston in the engagement direction.

At 316, transiently re-energizing the solenoid includes applying a second current to the solenoid. In various embodiments, the second current may be applied to the solenoid based on an output of an engagement sensor of the differential disconnect assembly (e.g., the engagement sensor 235 of FIGS. 2A and 2B). The engagement sensor may indicate a location of the dog clutch along a trajectory of the dog clutch from the fully engaged position to the fully retracted position. For example, the trajectory may include an engagement zone, where the dog clutch is engaged or close to being engaged, and a transition zone, where the dog clutch is approaching an end of the trajectory (e.g., at the fully retracted position). The engagement sensor may indicate when the dog clutch moves out of the engagement zone and into the transition zone. When the engagement senor indicates that the dog clutch has entered the transition zone, the controller may re-energize the solenoid by applying the second current. The engagement sensor may also indicate when the dog clutch has achieved the fully retracted position, at which point the dog clutch is in a disengaged state and no longer in the transition zone. When the engagement sensor indicates that the dog clutch has achieved the fully retracted position, the second current may be switched off, and the dog clutch may be maintained in the fully retracted position by the spring.

When the second current is delivered at the solenoid, a second magnetic field may be generated, which exerts a force on the piston in the engagement direction. In various embodiments, the second current may be less than the first current, where the force generated on the piston in the engagement direction is not sufficient to move the piston towards the fully extended position, but sufficient to slow the speed of the piston towards the fully retracted position. The second current may be selected based on a desired force or speed of the piston upon achieving the fully retracted position.

For example, the return spring may apply a first force on the piston in the disengagement direction to maintain the piston and the dog clutch in the fully retracted (e.g. disengaged) position. The first force may generate an undesirable amount of noise when the piston achieves the fully retracted position. The second current applied to the solenoid may be a current that is sufficient to generate a second force in the engagement direction. As a result of applying the second force in the engagement direction, a third force on the piston when the piston achieves the fully retracted position may be a difference between the first force and the second force. As a result of the piston achieving the fully retracted position with the third force as opposed to the first force, the amount of noise generated may be reduced to a desired noise threshold.

Figure 4:
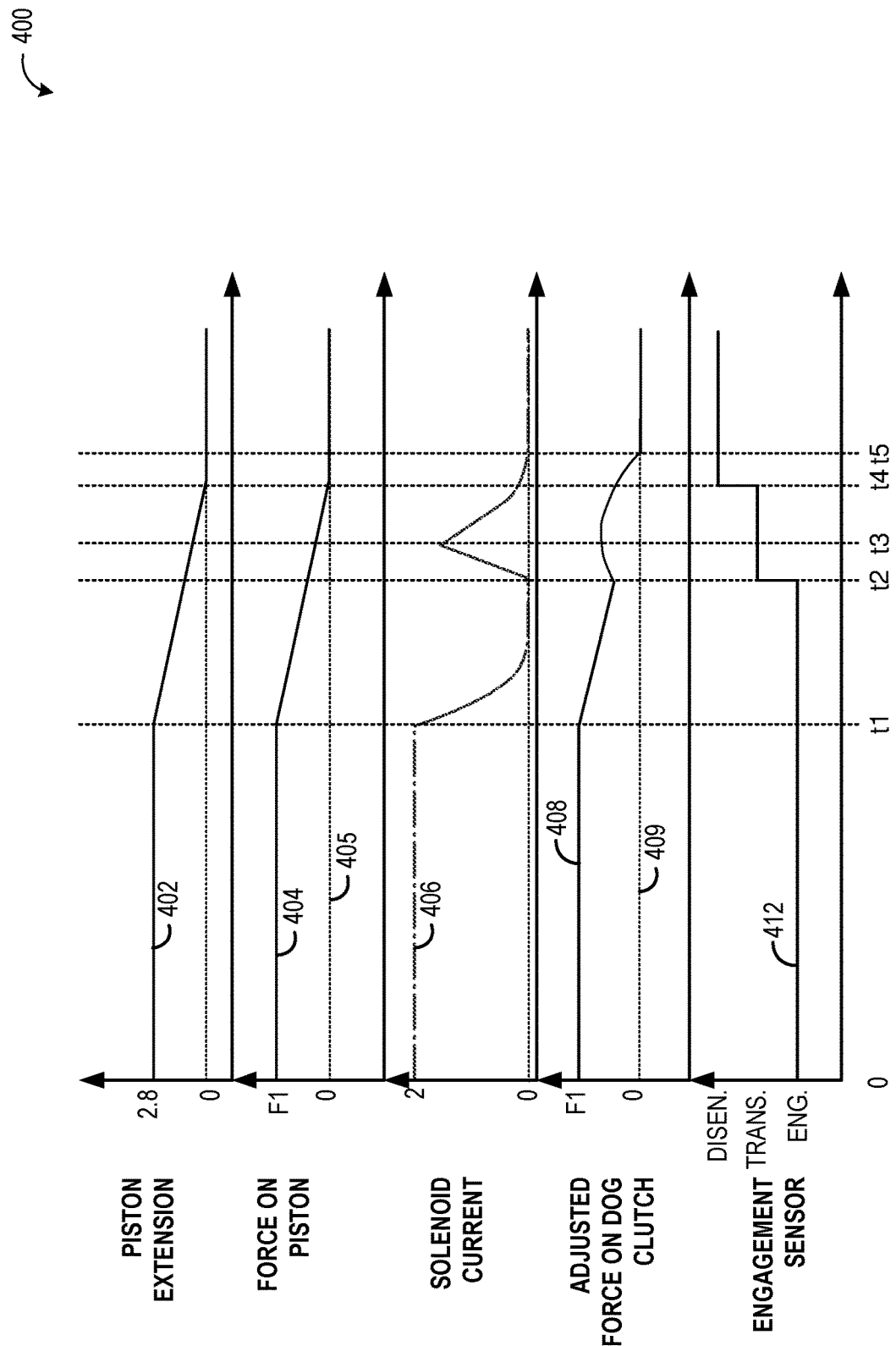
FIG. 4 is a timing diagram showing a relative timing of various events during a disengagement of a dog clutch of a differential disconnect assembly.

FIG. 4 shows an exemplary prophetic timing diagram 400, showing a first exemplary sequence of events during a disengagement of an input gear of a differential of a vehicle, such as an axle differential, from a plurality of output gears of the differential, via a differential disconnect assembly of a vehicle. The differential disconnect assembly may be a non-limiting example of the differential disconnect assembly 250 described above in reference to FIGS. 2A and 2B. In some embodiments, the vehicle may be an all-electric vehicle including a permanent magnet traction motor, and the differential may be included in an electric drive unit of the all-electric vehicle. During the disengagement, a current to a solenoid of the differential disconnect assembly may be adjusted to reduce a force with which a dog clutch is retracted against other components of the differential disconnect assembly when the dog clutch is disengaged, due to a return spring of the differential disconnect assembly. By reducing the force, an undesirable amount of noise caused by the dog clutch striking the other components may be reduced.

A horizontal (x-axes) of timing diagram 400 denotes time and the vertical markers t1-t5 denote significant times during the disengagement of the differential disconnect assembly. Timing diagram 400 includes five plots. A first plot, line 402, shows an extension of a piston of the solenoid, where the dog clutch is mechanically coupled to an end of the piston. When the piston is in a fully extended position (e.g., at 2.8 cm), the dog clutch may be engaged, where a first toothed interface of the dog clutch may be engaged with a second toothed interface of a differential of the vehicle. When the piston is in a fully retracted position (e.g., at 0 cm), the dog clutch may be disengaged. A second plot, line 404, shows a force applied to the piston of the dog clutch, where the force is generated in an engagement direction (e.g., opposite the fully retracted position). A dotted line 405 indicates a force of 0 on the piston when the dog clutch is the disengaged position, when the piston and dog clutch are fully retracted and no force is applied to the piston of the dog clutch. The force may be applied to the piston by a spring that holds the piston in the fully retracted position when no current is applied at a solenoid of the differential disconnect assembly. When a current is applied at the solenoid, a force may be applied to the piston in an opposite direction as the spring, which may extend the piston to the fully extended position where the dog clutch is in the engaged position (e.g., at a force F1). As described above, when the piston reaches the fully retracted position (e.g., where no current is delivered at the solenoid), due to a lack of an opposing force, the dog clutch may generate an impact with other components of the differential disconnect assembly, causing a noise. A third plot, line 406, shows a change in the current delivered at the solenoid. A fourth plot, line 408, shows an adjusted force applied to the dog clutch, where the adjusted force is a result of the change in the current delivered at the solenoid. A dotted line 409 indicates the force 0 on the dog clutch after the dog clutch is fully disengaged and the piston is in the fully retracted position. A fifth plot, line 412, shows an output of an engagement sensor (e.g., the engagement sensor 235 of FIGS. 2A and 2B) positioned along a trajectory travelled by the piston between the fully retracted position and the engaged position. The engagement sensor may indicate when the dog clutch has moved from an engagement zone to a transition zone, where the transition zone is a final portion of the trajectory prior to reaching the fully retracted position. As described above, a timing at which the solenoid is re-energized may depend on the entry of the dog clutch into the transition zone. The engagement sensor may also indicate when the dog clutch reaches the fully retracted position, when the dog clutch is fully disengaged.

Prior to time t1, the piston is fully extended and the dog clutch is in the engaged position, as indicated by lines 402 and 412. The dog clutch is maintained in the engaged position by energizing the solenoid with a first current (e.g., 2 mA) delivered at the solenoid. The first current delivered at the solenoid creates a first magnetic field, which applies the force F1 in the opposite direction as the spring, which maintains the dog clutch in the engaged position (e.g., an engagement direction). The force F1 generated by the first magnetic field is greater than the force of the spring on the piston when the piston is in the fully retracted position (e.g., 0).

At time t1, in response to a request to disengage the dog clutch, the first current delivered at the solenoid is decreased to zero. For example, an operator of the vehicle may command the disengagement of the dog clutch via an input device, such as a 2-4 wheel drive selector, that is designed to toggle the differential between dog clutch engagement and disengagement. Alternatively, the disengagement of the dog clutch may be automatically commanded by a controller in response to a change in operating conditions of the vehicle (e.g., a change in speed, road conditions, etc.).

Between t1 and t2, as a result of the first current being decreased to zero, the first magnetic field decreases to zero. As the first magnetic field decreases to zero, the force applied by the magnetic field (e.g., in the engagement direction) decreases and the piston is no longer held in the engaged position, and begins to travel to the fully retracted position, as indicated by line 402.

At time t2, the dog clutch enters the transition zone, as indicated by the engagement sensor, where the piston is approaching the fully retracted position. Without any intervention, the piston will continue to retract until reaching the fully retracted position at the end of its travel at t4, as indicated by line 402. Without any intervention, when the piston reaches the fully retracted position, the piston may strike the other components of the differential disconnect assembly, as indicated by line 404, creating a noise. Therefore, to reduce the amount of noise, at t2, the solenoid may be re-energized via a second current. The solenoid may be re-energized in response to the engagement sensor indicating that the dog clutch has moved from the engagement zone of the piston/dog clutch to the transition zone of the piston/dog clutch. In various embodiments, the second current may be less than the first current. When the second current is delivered, a second magnetic field is generated, which again generates a force on the piston in the opposite direction of the spring. The adjusted amount of force applied to the piston by the second magnetic field is shown by line 408.

Between t2 and t3, as a result of the second current delivered at the solenoid, the force on the piston in the engagement direction increases rapidly, reducing the force on the dog clutch applied by the spring, as shown by line 408.

At time t3, the second current delivered at the solenoid is decreased. When the second current is decreased, a strength of the second magnetic field generated by the solenoid decreases. Between times t3 and t4, the force on the piston decreases. The engagement sensor indicates that the dog clutch is still in the transition zone.

At time t4, the piston reaches the fully retracted position, as indicated by line 402, and the engagement sensor indicates that an end of the transition zone has been reached and that the dog clutch is fully disengaged. The second current delivered at the solenoid approaches zero. As a result of the second magnetic field, the force applied to the dog clutch by the spring at the time the piston reaches the fully retracted position is less than the force that would be applied to the dog clutch if the second current were not delivered to the solenoid. As a result of the lower force, the noise generated by the piston reaching the fully retracted position may be reduced.

Between time t4 and t5, due to the second current at the solenoid being decreased to zero, the adjusted force on the dog clutch indicated by line 408 decreases, until at time t5, the force on the piston reaches the 0 when the piston is in the fully retracted position in the absence of the second magnetic field.

Thus, rather than allowing the piston to be drawn into the fully retracted position by the force of the return spring alone, which may cause an undesirable amount of noise, as the piston approaches the fully retracted position, the second current is delivered to the solenoid to reduce the force of the spring and slow the piston down. After the piston has achieved the fully retracted position, the second current is discontinued. By advantageously using the second current in a transitory manner to slow the piston down, the benefits of using a spring to maintain the dog clutch in the disengaged position (e.g., reduced power consumption) may be achieved while reducing the noise caused by an impact of the dog clutch against other components of the differential disconnect assembly.

The technical effect of re-energizing the solenoid when the dog clutch is disengaged is that a force exerted on the dog clutch by the spring may be reduced, which may reduce an amount of noise generated by an impact of the dog clutch with other components of the differential disconnect assembly.

The disclosure also provides support for a method for operating a dog clutch, comprising: de-energizing a solenoid coupled to the dog clutch to initiate dog clutch disengagement, and during disengagement of the dog clutch when a return spring coupled to a first toothed interface of the dog clutch applies a first force on the first toothed interface in a first direction away from a second toothed interface, transiently re-energizing the solenoid that applies a second force to the first toothed interface in a second direction which is opposite the first direction. In a first example of the method, the method further comprises: prior to de-energizing the solenoid, sustaining energization of the solenoid during dog clutch engagement. In a second example of the method, optionally including the first example, sustaining energization of the solenoid includes applying a first current to the solenoid and transiently re-energizing the solenoid includes applying a second current to the solenoid, wherein the first current is greater than the second current. In a third example of the method, optionally including one or both of the first and second examples, the solenoid is re-energized in direct response to an engagement sensor indicating that the dog clutch has moved from an engagement zone to a transition zone. In a fourth example of the method, optionally including one or more or each of the first through third examples, the solenoid is re-energized at a predetermined time after the dog clutch has disengaged, where the predetermined time is determined based on simulation models that are fine-tuned to achieve noise reduction targets. In a fifth example of the method, optionally including one or more or each of the first through fourth examples, the solenoid is automatically de-energized after the dog clutch reaches a fully retracted position. In a sixth example of the method, optionally including one or more or each of the first through fifth examples, the dog clutch is included in a differential. In a seventh example of the method, optionally including one or more or each of the first through sixth examples, the differential is included in an electric drive unit of an all-electric vehicle.

The disclosure also provides support for a differential system, comprising: a differential with an input gear design to mesh with gear in a transmission and one or more pinion gears that mesh with a plurality of output gears, and a differential disconnect assembly comprising: a dog clutch designed to selectively disconnect the input gear from the plurality of output gears, and a solenoid coupled to the dog clutch and designed to engaged the dog clutch when energized, and a controller including instructions stored in non-transitory memory that when executed, during disengagement of the dog clutch, cause the controller to: transiently re-energize the solenoid to apply a force in an engagement direction that is opposite a disengagement direction. In a first example of the system, the controller further comprises instructions stored in the non-transitory memory that when executed, prior to disengagement of the dog clutch, energize the solenoid to sustain dog clutch engagement. In a second example of the system, optionally including the first example, a first current applied to the solenoid during transient re-energization is less than a second current applied to the solenoid while dog clutch engagement is sustained. In a third example of the system, optionally including one or both of the first and second examples, the solenoid is directly coupled to an axle shaft sleeve in a housing of the differential. In a fourth example of the system, optionally including one or more or each of the first through third examples, the dog clutch is disengaged in response actuation of an input device that is designed to toggle the differential between dog clutch engagement and disengagement. In a fifth example of the system, optionally including one or more or each of the first through fourth examples, the plurality of output gears are a pair of side gears that are designed to couple to a pair of axle shafts. In a sixth example of the system, optionally including one or more or each of the first through fifth examples, the differential system is included in an electric vehicle.

The disclosure also provides support for a method for operating a disconnect assembly in a differential system, comprising: energizing a solenoid with a first current to sustain engagement of a dog clutch in the disconnect assembly, initiating dog clutch disengagement via de-energization of the solenoid, and responsive to an engagement sensor indicating that the dog clutch has moved from an engagement zone to a transition zone during the dog clutch disengagement, re-energizing the solenoid via a second current that is less than the first current. In a first example of the method, the differential system includes an open axle differential. In a second example of the method, optionally including the first example, the solenoid circumferentially extends around an axle shaft sleeve. In a third example of the method, optionally including one or both of the first and second examples, dog clutch disengagement is automatically initiated or initiated in response to operator interaction with an input device. In a fourth example of the method, optionally including one or more or each of the first through third examples, the differential system is included in an electric drive unit with a permanent magnet traction motor.

FIGS. 2A and 2B are drawn approximately to scale. However, other relative component dimensions may be used, in other embodiments.

FIGS. 1-2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various powertrain and/or vehicle configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the electric motor control system, where the described actions are carried out by executing the instructions in a system in combination with the electronic controller.

It will be appreciated that the configurations and routines disclosed herein are exemplary in nature, and that these specific embodiments are not to be considered in a limiting sense, because numerous variations are possible. For example, the above technology can be applied to various types of vehicle and powertrain configurations. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a dog clutch, comprising:
de-energizing a solenoid coupled to the dog clutch to initiate dog clutch disengagement, wherein the solenoid is automatically de-energized after the dog clutch reaches a fully retracted position; and
during disengagement of the dog clutch when a return spring coupled to a first toothed interface of the dog clutch applies a first force on the first toothed interface in a first direction away from a second toothed interface, transiently re-energizing the solenoid in response to the dog clutch moving from an engagement zone to a transition zone, the re-energizing applies a second force to the first toothed interface in a second direction which is opposite the first direction.

2. The method of claim 1, further comprising, prior to de-energizing the solenoid, sustaining energization of the solenoid during dog clutch engagement.

3. The method of claim 2, wherein sustaining energization of the solenoid includes applying a first current to the solenoid and transiently re-energizing the solenoid includes applying a second current to the solenoid, wherein the first current is greater than the second current.

4. The method of claim 1, wherein the solenoid is re-energized at a predetermined time after the dog clutch has disengaged, where the predetermined time is determined to reduce noise and the determination is based on simulation models.

5. The method of claim 1, wherein the dog clutch is included in a differential and the differential is included in an electric drive unit of an all-electric vehicle.

6. A differential system, comprising:
a differential with an input gear meshing with a gear in a transmission and one or more pinion gears that mesh with a plurality of output gears; and
a differential disconnect assembly comprising:
a dog clutch selectively disconnecting the input gear from the plurality of output gears; and
a solenoid coupled to the dog clutch and engage the dog clutch when energized; and
a controller including instructions stored in non-transitory memory that when executed, during disengagement of the dog clutch, cause the controller to:
energize the solenoid with a first current value;
de-energize the solenoid to disengage the dog clutch;
following the de-energization, transiently re-energize the solenoid in response to the dog clutch moving from an engagement zone to a transition zone, the re-energizing using a second current value to apply a force in an engagement direction that is opposite a disengagement direction when the dog clutch is disengaged but before the dog clutch reaches a fully retracted position.

7. The differential system of claim 6, wherein the controller further comprises instructions stored in the non-transitory memory that when executed, prior to disengagement of the dog clutch, energize the solenoid to sustain dog clutch engagement.

8. The differential system of claim 7, wherein a first current applied to the solenoid during transient re-energization is less than a second current applied to the solenoid while dog clutch engagement is sustained.

9. The differential disconnect assembly of claim 6, wherein the solenoid is directly coupled to an axle shaft sleeve in a housing of the differential.

10. The differential disconnect assembly of claim 6, wherein the dog clutch is disengaged in response actuation of an input device which toggles the differential between dog clutch engagement and disengagement.

11. The differential disconnect assembly of claim 6, wherein the plurality of output gears are a pair of side gears which couple to a pair of axle shafts.

12. The method of claim 11, wherein the re-energizing of the solenoid occurs following the de-energization and prior to the dog clutch reaching a fully retracted position.

13. The method of claim 12, wherein re-energizing the solenoid prior to the dog clutch reaching a fully retracted position slows movement of the dog clutch toward the fully retracted position.

14. The method of claim 6, further comprising instructions for de-energizing the solenoid after the dog clutch reaches a fully retracted position.

15. A method for operating a disconnect assembly in a differential system, comprising:
energizing a solenoid with a first current to sustain engagement of a dog clutch in the disconnect assembly;
initiating dog clutch disengagement via de-energization of the solenoid; and
responsive to an engagement sensor indicating that the dog clutch has moved from an engagement zone to a transition zone during the dog clutch disengagement, re-energizing the solenoid via a second current that is less than the first current.

16. The method of claim 15, wherein the differential system includes an open axle differential.

17. The method of claim 15, wherein the solenoid circumferentially extends around an axle shaft sleeve.

18. The method of claim 15, wherein dog clutch disengagement is automatically initiated or initiated in response to operator interaction with an input device.

19. The method of claim 15, wherein the differential system is included in an electric drive unit with a permanent magnet traction motor.

* * * * *